(12) United States Patent
Yamanaka

(10) Patent No.: US 8,508,961 B2
(45) Date of Patent: Aug. 13, 2013

(54) POWER CONVERSION APPARATUS

(75) Inventor: Katsutoshi Yamanaka, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 274 days.

(21) Appl. No.: 12/962,671

(22) Filed: Dec. 8, 2010

(65) Prior Publication Data

US 2011/0149624 A1  Jun. 23, 2011

(30) Foreign Application Priority Data

Dec. 22, 2009 (JP) ................................. 2009-291114

(51) Int. Cl.
*H02M 1/12* (2006.01)
(52) U.S. Cl.
USPC .................. 363/40; 363/41; 363/98; 363/132
(58) Field of Classification Search
USPC .................. 363/55, 56.01, 56.02, 57, 58, 71, 363/95, 96, 97, 98, 131, 132, 135, 136, 40, 363/41
See application file for complete search history.

(56) References Cited

U.S. PATENT DOCUMENTS

| 3,707,668 A | * | 12/1972 | Johnston | ...................... | 363/137 |
| 4,787,021 A | * | 11/1988 | Hokari et al. | .................. | 363/37 |
| 2011/0128763 A1 | * | 6/2011 | Iwata et al. | ...................... | 363/98 |

FOREIGN PATENT DOCUMENTS

| JP | 02-206385 | 8/1990 |
| JP | 2005-269735 | 9/2005 |

OTHER PUBLICATIONS

Muhammad H. Rashid, Power Electronics Handbook, Academic Press, Chapter 14.3 and Chapter 14.4 in pp. 235-243.

* cited by examiner

*Primary Examiner* — Nguyen Tran
(74) *Attorney, Agent, or Firm* — Ditthavong Mori & Steiner, P.C.

(57) ABSTRACT

A power conversion apparatus includes two power conversion circuits, two direct-current inductors, and a pulse-width-modulation control circuit. One of the two power conversion circuits is connected in parallel to a direct-current load or a single-phase alternating-current load, and the other of the two power conversion circuits is connected in parallel to a three-phase alternating-current load. The two power conversion circuits are connected in reverse polarity to each other via the two direct-current inductors. The pulse-width-modulation control circuit pulse-width-modulates the two power conversion circuits, allows switching between the two power conversion circuits, and realizes a bidirectional step-up/down operation between the direct-current load or single-phase alternating-current load and the three-phase alternating-current load.

14 Claims, 15 Drawing Sheets

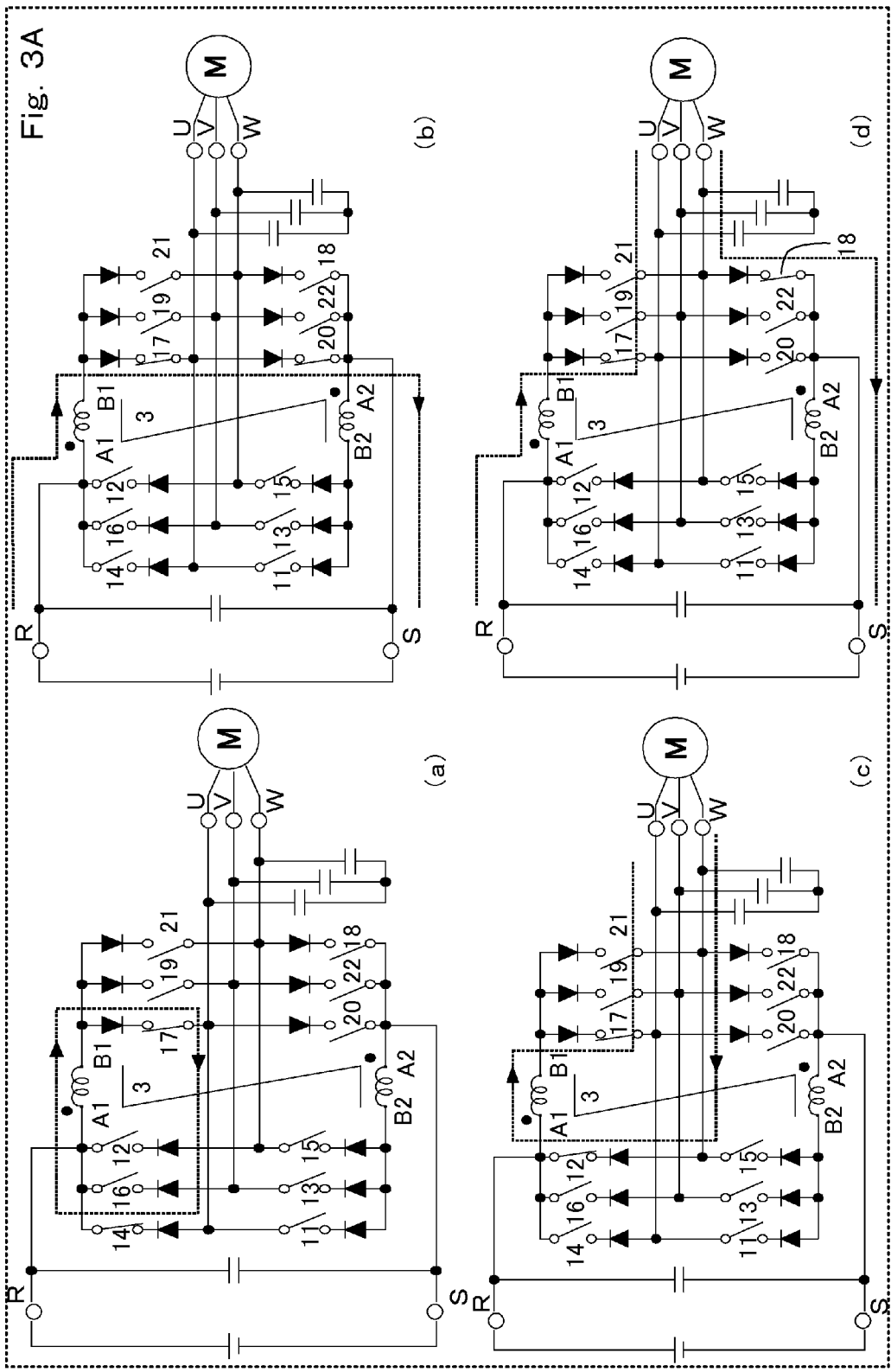

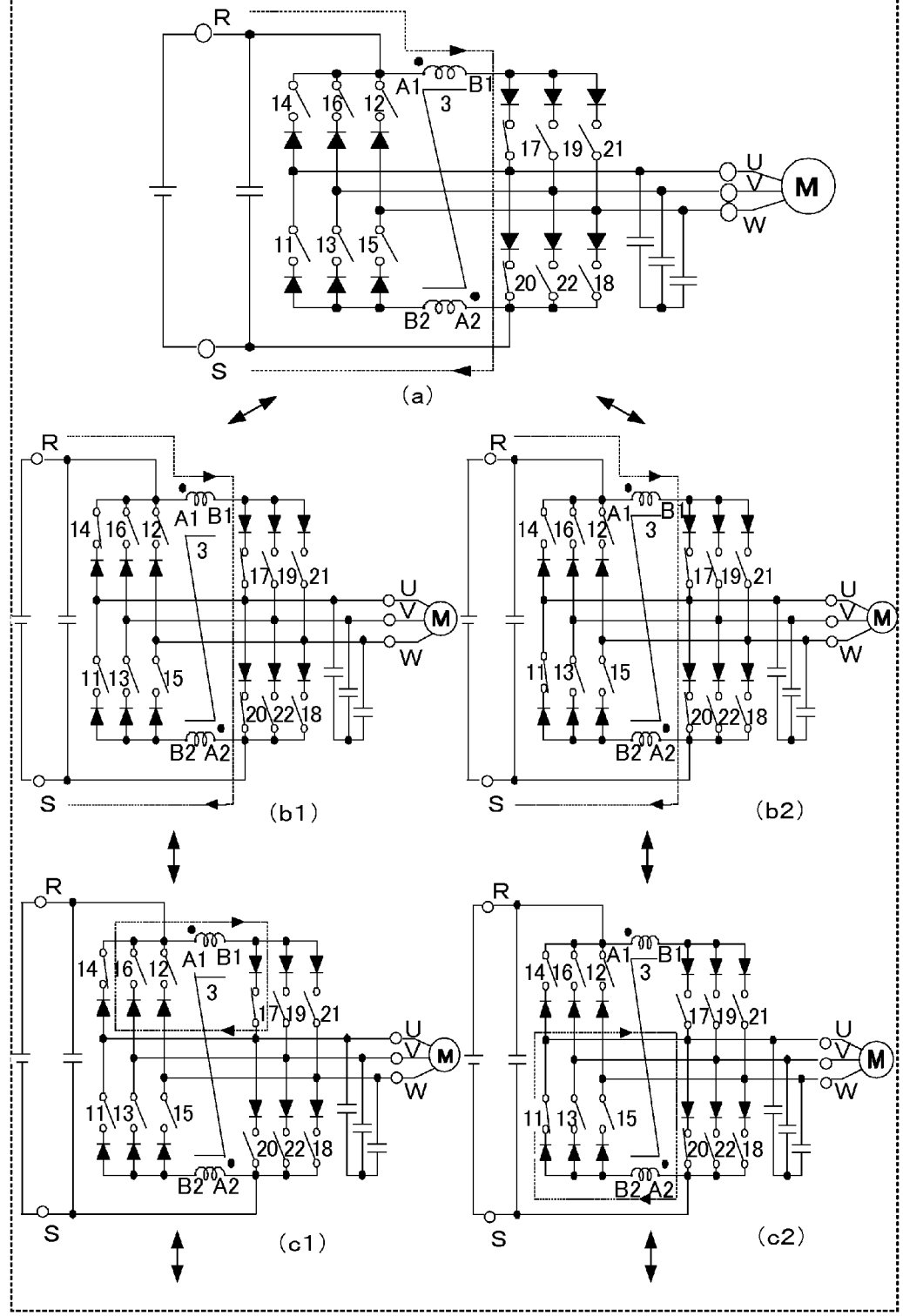

POWER CONVERSION APPARATUS

CROSS-REFERENCE TO RELATED APPLICATION

The present application claims priority under 35 U.S.C. §119 to Japanese Patent Application No. 2009-291114, filed Dec. 22, 2009. The contents of the application are incorporated herein by reference in their entirety.

BACKGROUND OF THE INVENTION

1. Field of the Invention

The present invention relates to power conversion apparatuses.

2. Description of Related Art

A static-Leonard power conversion apparatus using thyristors is capable of performing a step-up/down operation based on bidirectional conversion between direct current or single-phase alternating current and three-phase alternating current, and of performing rapid switching between acceleration and regeneration. The static Leonard system has general technical problems, such as low power factor caused by phase control of thyristors and low efficiency caused by cyclic currents.

Japanese Unexamined Patent Application Publication No. 2005-269735 discloses a vehicle propulsion apparatus that includes wheel motors for driving respective wheels and inverters for driving the respective wheel motors. The inverters are current-type inverters. The vehicle propulsion apparatus further includes a direct-current power supply and a plurality of direct-current generating circuits that supply current from the direct-current power supply to the respective inverters.

Japanese Unexamined Patent Application Publication No. 2-206385 discloses a technique related to controlling a duty factor of an inverter that supplies alternating-current power to an electric motor. Specifically, what is disclosed is a current-type inverter that can increase the output voltage of an inverter using a duty factor of the inverter.

SUMMARY OF THE INVENTION

According to one aspect of the present invention, a power conversion apparatus includes two power conversion circuits that are respectively connected in parallel to a direct-current load (or single-phase alternating-current load) and a three-phase alternating-current load; two direct-current inductors; and a pulse-width-modulation (PWM) control circuit that pulse-width-modulates the two power conversion circuits. The two power conversion circuits are current-type inverters, and are connected in reverse polarity to each other via the two direct-current inductors. The PWM control circuit allows switching between the two power conversion circuits and realizes a bidirectional step-up/down operation between the direct-current load (or single-phase alternating-current load) and the three-phase alternating-current load.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3A and FIG. 3B illustrate a power conversion operation from a battery to a motor;

FIG. 7A and FIG. 7B illustrate an acceleration/regeneration switching operation;

DESCRIPTION OF THE EMBODIMENTS

Figure 1:
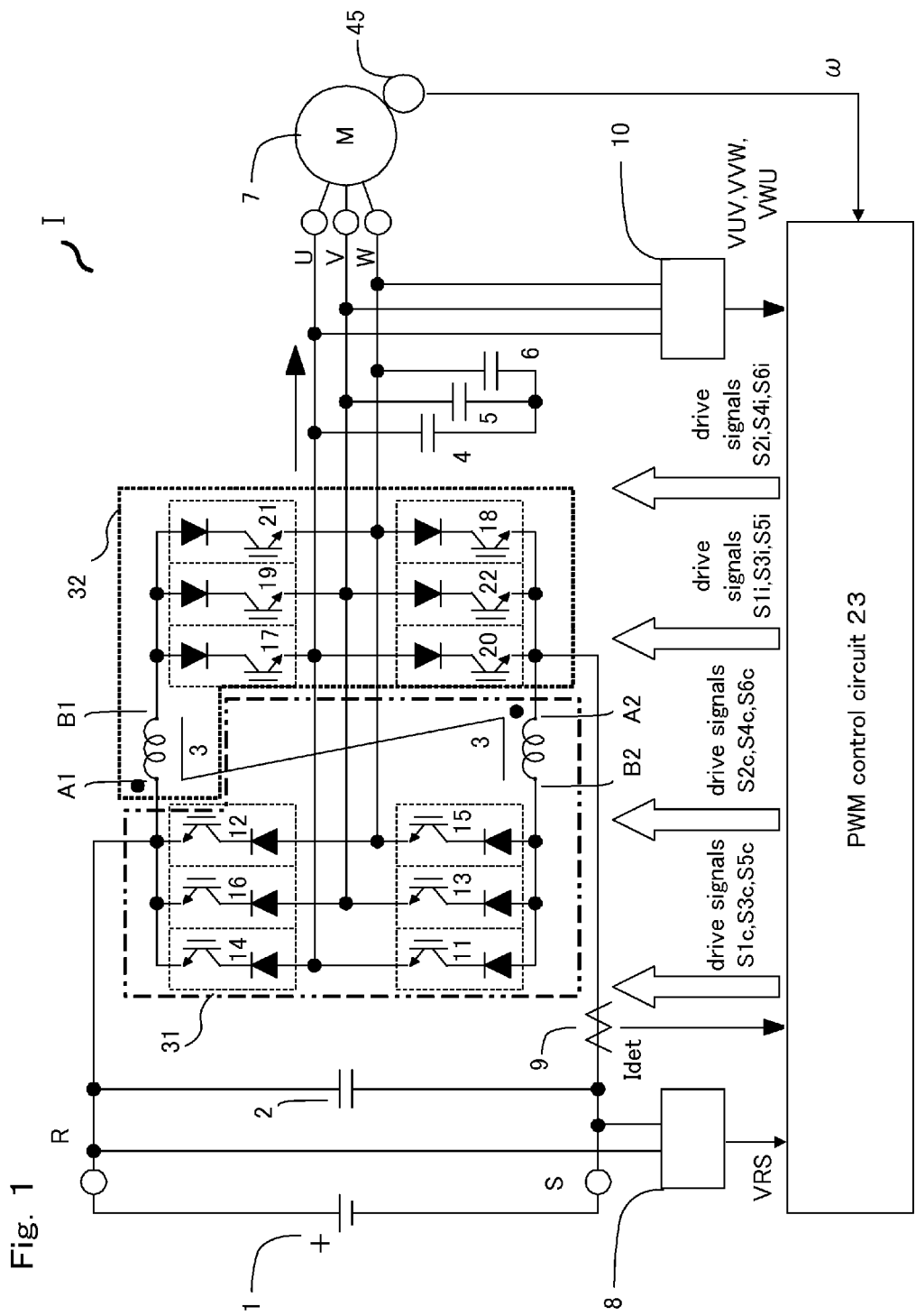
FIG. 1 is a block diagram illustrating a configuration of a power conversion apparatus according to a first embodiment of the present invention.

Embodiments will now be described with reference to the accompanying drawings, wherein like reference numerals designate corresponding or identical elements throughout the various drawings.

FIG. 1 is a block diagram illustrating a power conversion apparatus I according to a first embodiment of the present invention.

The power conversion apparatus I includes a storage battery (hereinafter simply referred to as "battery") 1; capacitors 2, 4, 5, and 6; a coupled inductor 3; an electric motor (hereinafter simply referred to as "motor") 7; voltage detectors 8 and 10; a current detector 9; a PWM control circuit 23; a first power conversion circuit 31; a second power conversion circuit 32; and a speed detector 45.

The battery 1 serves as a direct-current load, and the motor 7 serves as a three-phase alternating-current load.

The coupled inductor 3 has a first winding and a second winding. The speed detector 45 detects a speed of the motor 7.

The PWM control circuit 23 pulse-width-modulates the first power conversion circuit 31 and the second power conversion circuit 32.

The first power conversion circuit 31 and the second power conversion circuit 32 are current-type inverters. The first power conversion circuit 31 and the second power conversion circuit 32 are connected in parallel to the battery 1 and the motor 7, respectively, and are connected in reverse polarity to each other via the coupled inductor 3.

The first power conversion circuit 31 is a circuit for power conversion from the motor 7 to the battery 1 (regeneration). The first power conversion circuit 31 includes one-way switches 11 to 16 and a second winding A2-B2, and is driven by drive signals S1c to S6c.

The second power conversion circuit 32 is a circuit for power conversion from the battery 1 to the motor (acceleration). The second power conversion circuit 32 includes one-way switches 17 to 22 and a first winding A1-B1, and is driven by drive signals S1i to S6i.

The one-way switches 11 to 22 each have self arc suppression capability and include a diode and an insulated gate bipolar transistor (IGBT) that are connected in series. Alternatively, the one-way switches 11 to 22 each may include a reverse blocking IGBT (RB-IGBT), which is capable of functioning alone as a one-way switch.

A three-phase alternating-current terminal of each of the first power conversion circuit 31 and the second power conversion circuit 32 is connected to the motor 7 via terminals U, V, and W. A positive direct-current terminal of the first power conversion circuit 31 is a terminal R connected to the positive pole of the battery 1. A positive direct-current terminal of the second power conversion circuit 32 is a terminal S connected to the negative pole of the battery 1.

The coupled inductor 3 has the first winding A1-B1 and the second winding A2-B2, which are wound about respective cores the same number of times. The first winding A1-B1 and the second winding A2-B2 are coupled in the direction of dot marks shown in FIG. 1.

The first winding A1-B1 is connected at A1 to the positive pole (i.e., a direct-current terminal where current flows out) of the first power conversion circuit 31, and is connected at B1 to the negative pole (i.e., a direct-current terminal where current flows in) of the second power conversion circuit 32. The second winding A2-B2 is connected at B2 to the negative pole of the first power conversion circuit 31, and is connected at A2 to the positive pole of the second power conversion circuit 32.

The capacitor 2 is connected between the terminals R and S. The capacitors 4, 5, and 6 are connected at their one ends to the terminals U, V, and W, respectively, and connected to each other at their other ends. The capacitors 2 and 4 to 6 form a filter that prevents current ripples from flowing into loads, such as the battery 1 and the motor 7, and thus reduces variations in inter-terminal voltage VRS (i.e., voltage between the terminals R and S).

Figure 2:
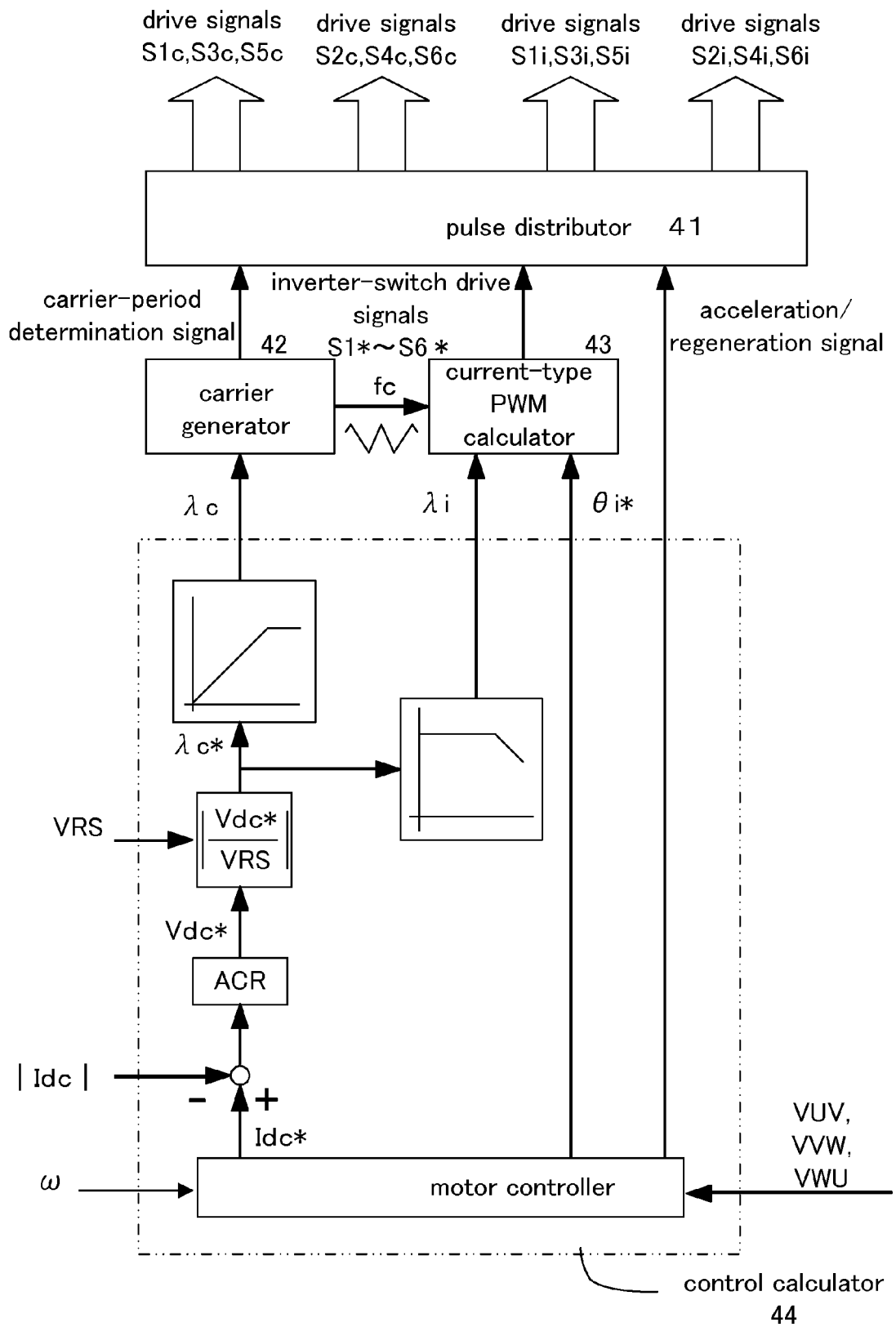
FIG. 2 is a detailed block diagram illustrating a PWM control circuit according to the first embodiment.

FIG. 2 is a detailed block diagram illustrating the PWM control circuit 23. The PWM control circuit 23 includes a pulse distributor 41, a carrier generator 42, a current-type PWM calculator 43, and a control calculator 44.

The pulse distributor 41 distributes inverter-switch drive signals S1* to S6* as the drive signals S1c to S6c to the first power conversion circuit 31, or as the drive signals S1i to S6i to the second power conversion circuit 32. For the distribution, the pulse distributor 41 uses an acceleration/regeneration signal and a carrier-period determination signal. The detail of this distribution method will be discussed later on.

The carrier generator 42 generates an uneven carrier waveform fc and outputs it to the current-type PWM calculator 43. The uneven carrier waveform fc is shaped like a triangular wave and takes values in the 0 to 1 range. The fall time and the rise time in one cycle of the uneven carrier waveform fc correspond to $\lambda c \times Tc$ and $(1-\lambda c) \times Tc$, respectively, where Tc is a carrier cycle and $\lambda c$ is a duty factor of a current vector of a converter. At the same time, the carrier generator 42 outputs a carrier-period determination signal to the pulse distributor 41. The carrier-period determination signal is ON in the $\lambda c \times Tc$ period of the uneven carrier waveform fc and is OFF in the $(1-\lambda c) \times Tc$ period of the uneven carrier waveform fc.

The current-type PWM calculator 43 generates the inverter-switch drive signals S1* to S6* in accordance with the following procedure, and outputs them to the pulse distributor 41.

First, from a duty factor $\lambda i$ of a current vector of an inverter and a current phase command $\theta i^*$, the current-type PWM calculator 43 calculates the output duration of the current vector. For example, when PWM control is performed by using one zero current vector Io and two non-zero current vectors Ii and Ii+1 that are adjacent to a current command vector having values of the duty factor $\lambda i$ and phase $\theta i^*$, the output durations of the respective current vectors can be calculated by equations (1):

$$T_i = Ts \times \lambda i \times \sin\left(\frac{\pi}{3} - \theta\right) \quad (1)$$
$$T_{i+1} = Ts \times \lambda i \times \sin(\theta)$$
$$Tz = Ts - T_i - T_{i+1}$$

where $T_i$ is the output duration of the current vector Ii, $T_{i+1}$ is the output duration of the current vector Ii+1, Tz is the output duration of the current vector Io, Ts is a PWM cycle, and $\theta$ is an angle between the current command vector and the current vector Ii.

Next, the current-type PWM calculator 43 calculates PWM pulse duration commands To and T1 used for comparison with the uneven carrier waveform fc by using equations (2), which normalize the output durations $T_i$ and $T_{i+1}$ of the current vectors such that the carrier waveform takes values in the 0 to 1 range:

$$T1 = \frac{T_i}{Ts} \quad (2)$$
$$To = \frac{T_i + T_{i+1}}{Ts}$$

Last, the current-type PWM calculator 43 compares the PWM pulse duration commands To and T1 with the uneven carrier waveform fc, and generates the inverter-switch drive signals S1* to S6* for outputting the corresponding current vectors Io, Ii, and Ii+1.

The current-type PWM calculator 43 thus generates the inverter-switch drive signals S1* to S6* and outputs them to the pulse distributor 41.

The control calculator 44 controls the rotation of the motor 7 serving as a load. The control calculator 44 receives the following inputs: the inter-terminal voltage VRS detected by the voltage detector 8 and equivalent to the voltage of the battery 1; a speed $\omega$ detected by the speed detector 45 for the motor 7; inter-terminal voltages VUV, VVW, and VWU (i.e., voltages between terminals U and V, terminals V and W, and terminals W and U) detected by the voltage detector 10; and current Idet that flows through the direct-current terminal S and is detected by the current detector 9.

The control calculator 44 outputs the following: a torque command (not shown) obtained by controlling the motor 7 such that the detected speed $\omega$ matches a speed command $\omega^*$ issued to the motor 7; a current phase command $\theta i^*$ obtained by controlling the rotation of the motor 7 in accordance with an input detected signal; a direct-current inductor current command Idc*; and the acceleration/regeneration signal.

Additionally, the control calculator 44 calculates a converter voltage command Vdc* by controlling the current such that a direct-current inductor current |Idc| matches the direct-current inductor current command Idc*. The direct-current inductor current |Idc| is determined as a peak value within the carrier cycle Tc of the current Idet detected by the current detector 9. The method for detecting the direct-current inductor current |Idc| is not limited to this. For example, the direct-current inductor current |Idc| may be detected by measuring a magnetic flux of the direct-current inductor with a Hall sensor and converting the magnetic flux. Alternatively, the direct-current inductor current |Idc| may be obtained by converting a value detected when the two windings of the direct-current inductor are wound about a current transformer at the same time. The converter voltage command Vdc* is positive during acceleration and is negative during regeneration. The control calculator 44 outputs the acceleration/regeneration signal in accordance with this polarity.

The converter voltage command Vdc* is normalized by the inter-terminal voltage VRS of the battery 1, and the absolute value of the resulting value is a converter duty factor command $\lambda c^*$. A converter duty factor $\lambda c$ is determined by a process in which the converter duty factor command $\lambda c^*$ is limited to a predetermined value $\lambda$limit such that the converter duty factor $\lambda c$ does not exceed one. An inverter duty factor $\lambda i$ is determined by a process in which if the converter duty factor command $\lambda c^*$ does not exceed the predetermined value $\lambda$limit, the inverter duty factor $\lambda i$ is set to the predetermined value $\lambda$limit and if the converter duty factor command $\lambda c^*$ exceeds the predetermined value $\lambda$limit, the inverter duty factor $\lambda i$ is reduced in accordance with a difference between the converter duty factor command $\lambda c^*$ and the predetermined value $\lambda$limit.

Figure 5:
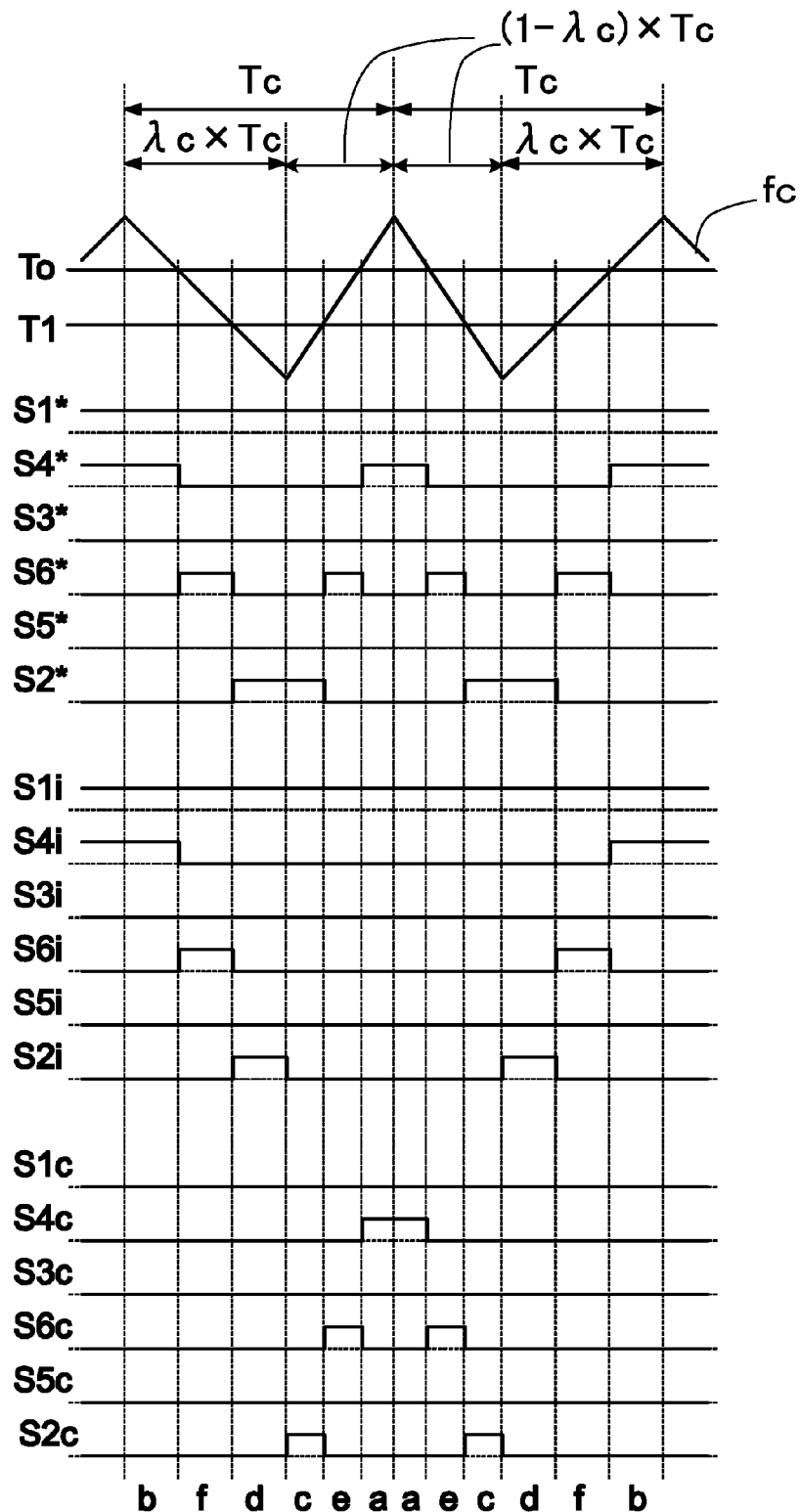
FIG. 5 illustrates inverter-switch drive signals (during acceleration)
Figure 6:
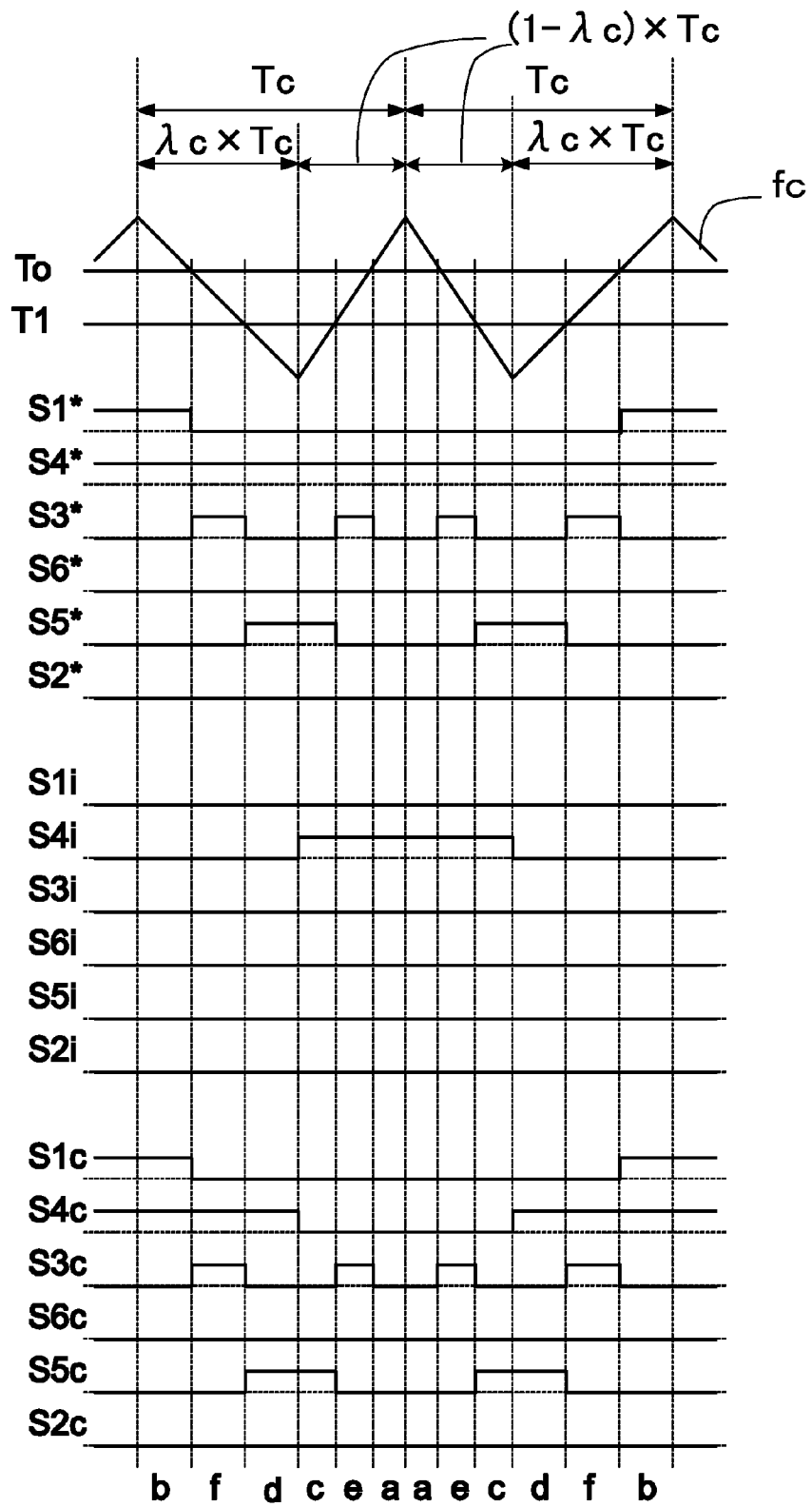
FIG. 6 illustrates inverter-switch drive signals (during regeneration)

An example of pulse generation performed by the pulse distributor 41 during acceleration (see FIG. 5) and regeneration (see FIG. 6) will now be described. FIG. 5 and FIG. 6 show the PWM pulse duration commands To and T1 calculated on the basis of the inverter duty factor $\lambda i$ and the current phase command $\theta i^*$, and also show the inverter-switch drive signals S1* to S6*. In the drawings, Low and High levels of a pulse signal correspond to off and on states thereof, respectively.

FIG. 5 illustrates pulse generation during acceleration. In the $\lambda c \times Tc$ period of the uneven carrier waveform fc, the inverter-switch drive signals S1* to S6* are distributed as the drive signals S1$i$ to S6$i$, so that the drive signals S1$c$ to S6$c$ are all off. In the $(1-\lambda c) \times Tc$ period of the uneven carrier waveform fc, the inverter-switch drive signals S2*, S4*, and S6* are distributed as the drive signals S2$c$, S4$c$, and S6$c$, so that the drive signals S2$i$, S4$i$, and S6$i$ are off.

FIG. 6 illustrates pulse generation during regeneration. In the $\lambda c \times Tc$ period of the uneven carrier waveform fc, the inverter-switch drive signals S1* to S6* are distributed as the drive signals S1$c$ to S6$c$, so that the drive signals S11 to S6$i$ are all off. In the $(1-\lambda c) \times Tc$ period of the uneven carrier waveform fc, the inverter-switch drive signals S2*, S4*, and S6* are distributed as the drive signals S2$i$, S4$i$, and S6$i$, so that the drive signals S2$c$, S4$c$, and S6$c$ are off.

Thus, the PWM control circuit 23 allows switching between the first power conversion circuit 31 and the second power conversion circuit 32.

A step-up/down operation and an acceleration/regeneration operation will now be specifically described.

Figure 3B:
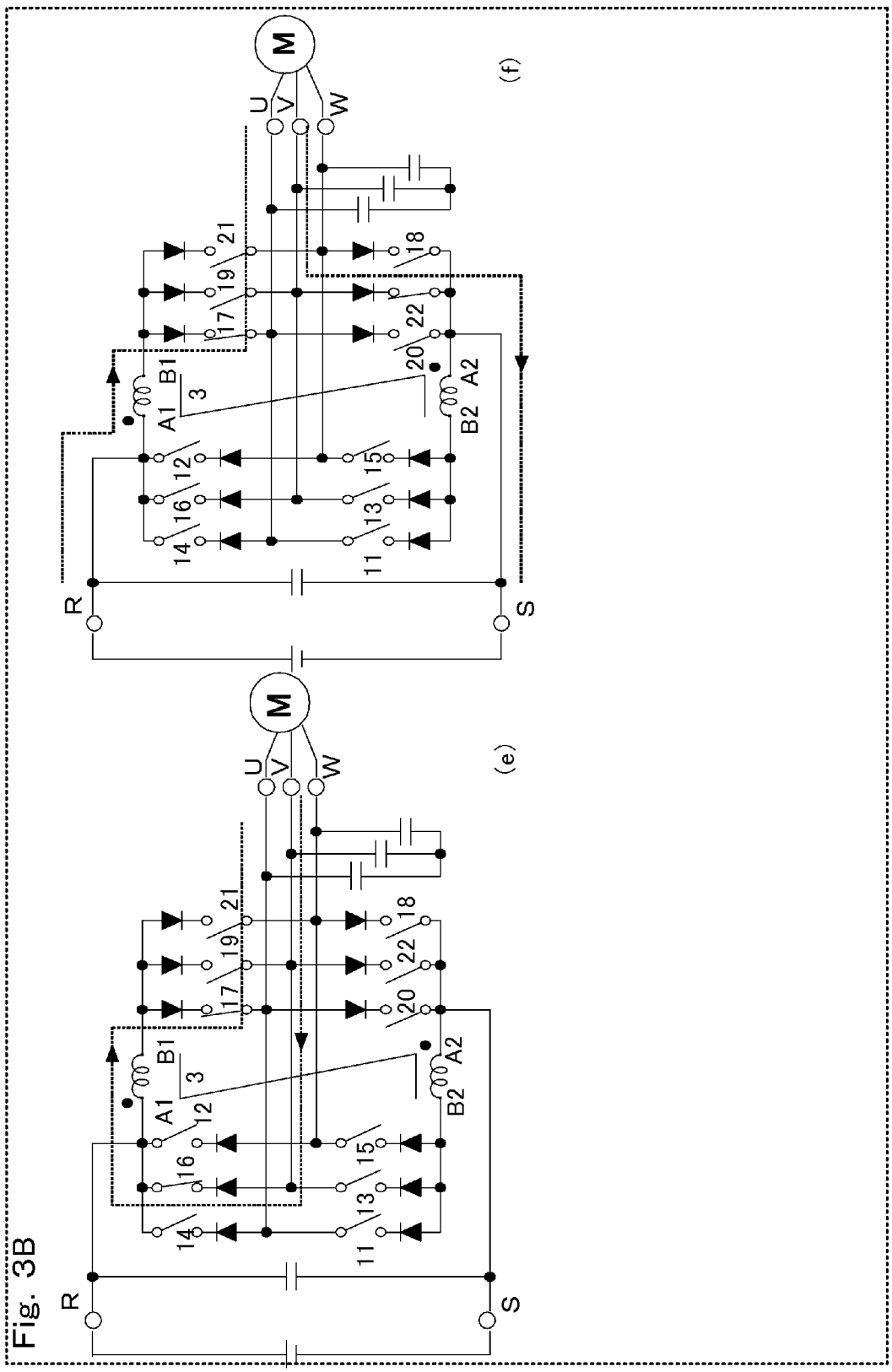

Referring to FIG. 3A and FIG. 3B, power conversion from the battery 1 to the motor 7 will be described. In the drawing, IGBTs are illustrated as mechanical switches to clearly indicate their on/off state. This applies to other drawings.

When voltage control is not performed on a converter voltage Vdc, only the second power conversion circuit 32 is pulse-width-modulated in accordance with the inverter duty factor $\lambda i$ and the current phase command $\theta i^*$. For example, around a region where a load power factor is almost one and the U-phase current is the largest on the positive side, the drive signals S1$i$ to S6$i$ for the one-way switches 17 to 22 are switched in the following order: FIG. 3A(b), FIG. 3A(d), and FIG. 3B(f).

When voltage control (regulation) is performed on converter voltage Vdc, both the first power conversion circuit 31 and the second power conversion circuit 32 are pulse-width-modulated in accordance with the inverter duty factor $\lambda i$ and the current phase command $\theta i^*$. Therefore, in addition to the state in FIG. 3A(b), FIG. 3A(d), and FIG. 3B(f), FIG. 3A(a), FIG. 3A(c), and FIG. 3B(e) can be switched so that the switch state. The states of current in the motor 7 on the three-phase alternating-current side are the same in each of the following pairs: FIGS. 3A(a) and (b), FIGS. 3A(c) and (d), and FIGS. 3B(e) and (f). This is taken into account when the pulse-width modulation is performed in accordance with the converter duty factor $\lambda c$.

That is, when the converter duty factor $\lambda c$ increases (decreases), the time ratios for FIG. 3A(b), FIG. 3A(d), and FIG. 3B(f) are increased (decreased) and the time ratios for FIG. 3A(a), FIG. 3A(c), and FIG. 3B(e) are decreased (increased) so that the average value of the converter voltage Vdc becomes high (low).

During this operation, the one-way switches 11, 13, and 15 are always off, the terminal B2 of the winding of the coupled inductor 3 is open, and the coupled inductor 3 acts as an inductor not as a transformer.

A step-up operation or a step-down operation is selected depending on the relationship between the inverter duty factor $\lambda i$ and the converter duty factor $\lambda c$. If $\lambda i < \lambda c$, a step-up operation from the battery 1 to the motor 7 (i.e., acceleration from direct-current voltage to three-phase alternating current) is performed. If $\lambda i > \lambda c$, a step-down operation from the battery 1 to the motor 7 (i.e., acceleration from direct-current voltage to three-phase alternating current) is performed.

Figure 4A:
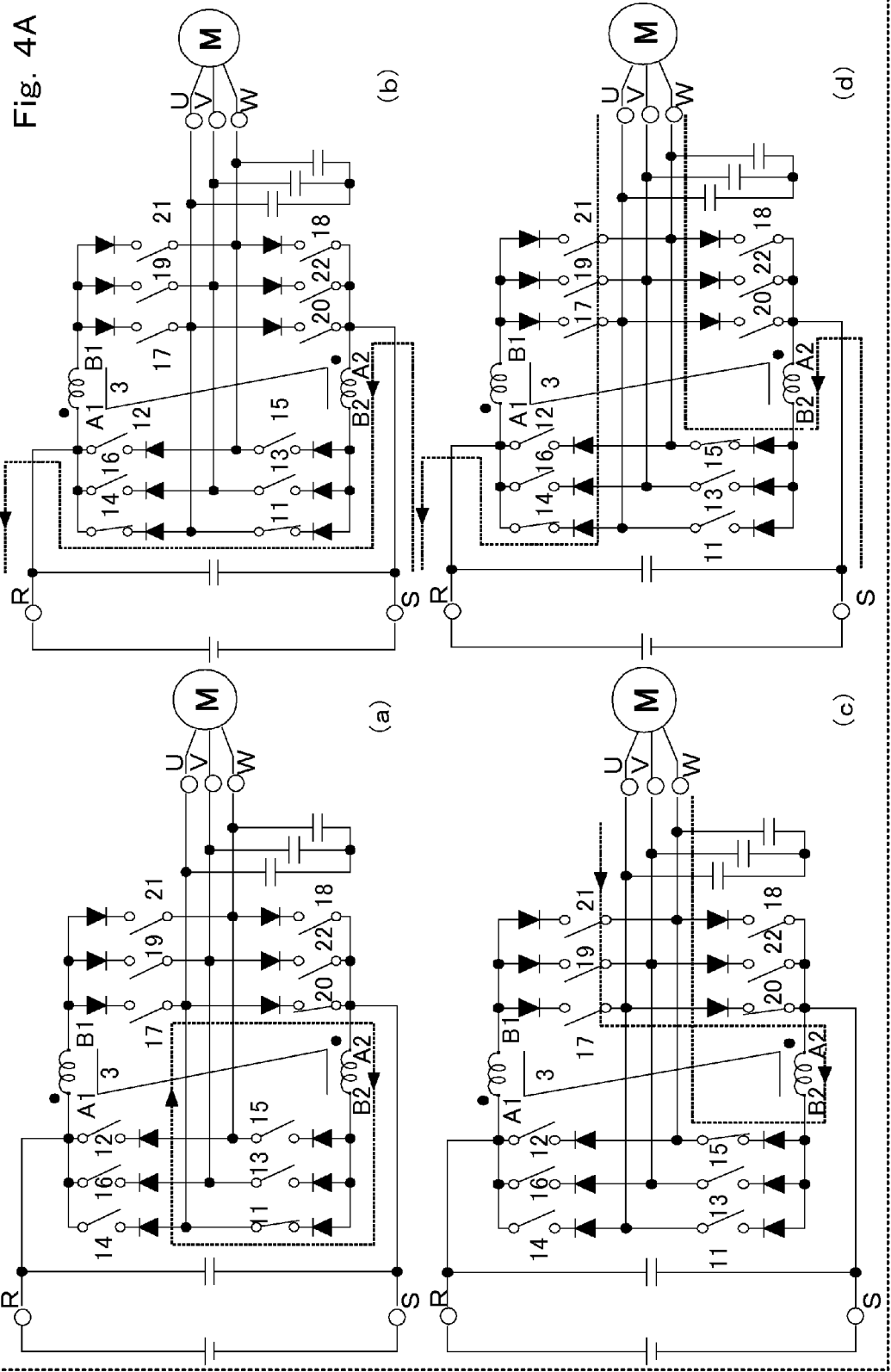
FIG. 4A and FIG. 4B illustrate a power conversion operation from a motor to a battery.
Figure 4B:
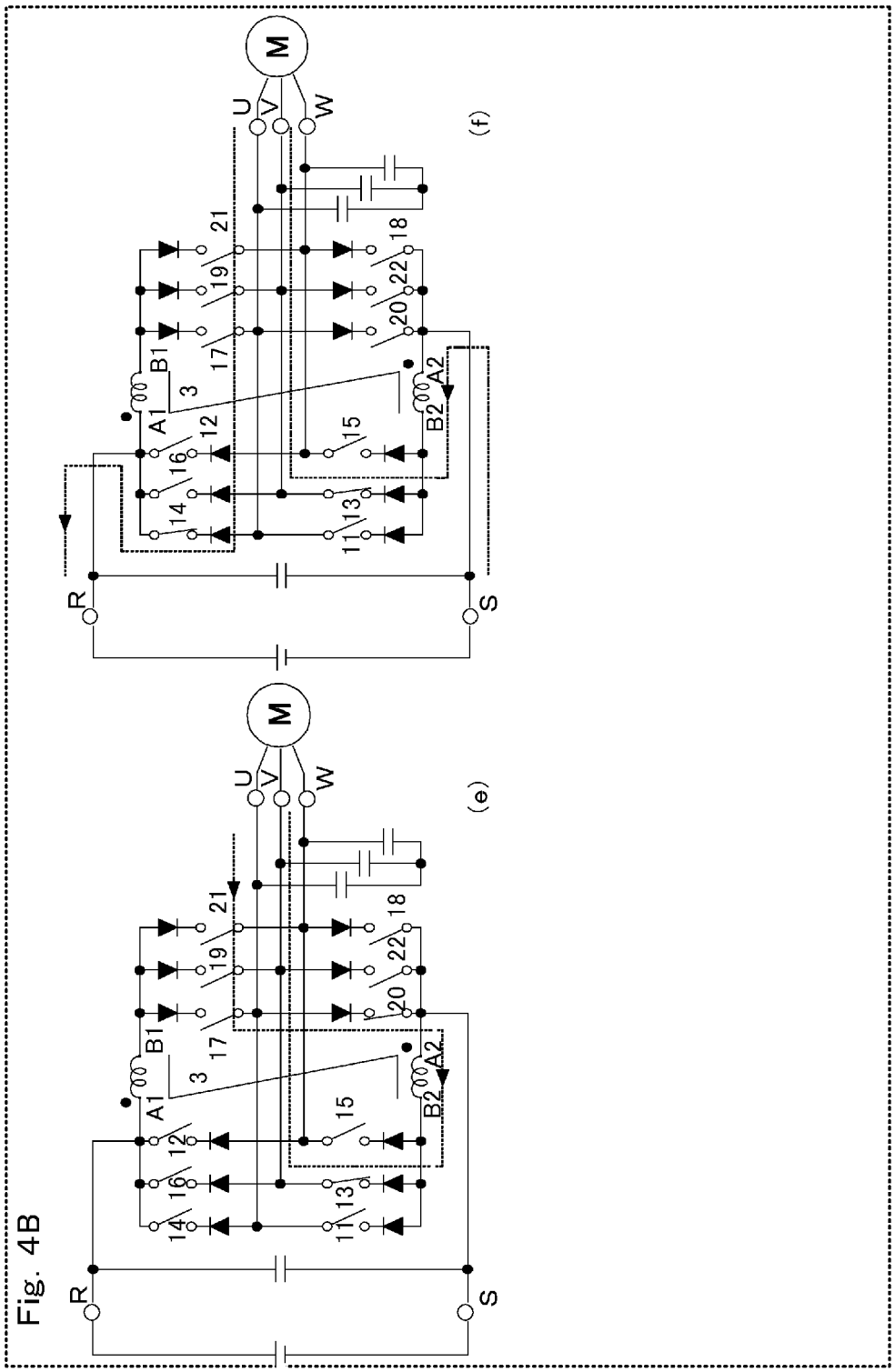

Referring to FIG. 4A and FIG. 4B, an operation for power conversion from the motor 7 to the battery 1 will be specifically described.

When voltage control is not performed on the converter voltage Vdc, only the first power conversion circuit 31 is pulse-width-modulated in accordance with the inverter duty factor $\lambda i$ and the current phase command $\theta i^*$. A current phase in FIG. 4A and FIG. 4B is different by 180° from that in FIG. 3A and FIG. 3B. For example, around a region where the U-phase current is the largest on the negative side, the drive signals S1$c$ to S6$c$ for the one-way switches 11 to 16 are switched in the following order: FIG. 4A(b), FIG. 4A(d), and FIG. 4B(f).

When voltage control (regulation) is performed on the converter voltage Vdc, both the first power conversion circuit 31 and the second power conversion circuit 32 are pulse-width-modulated in accordance with the inverter duty factor $\lambda i$ and the current phase command $\theta i^*$. Therefore, in addition to the state in FIG. 4A(b), FIG. 4A(d), and FIG. 4B(f), FIG. 4A(a), FIG. 4A(c), and FIG. 4B(e) can be switched so that the switch state. The states of current in the motor 7 on the three-phase alternating-current side are the same in each of the following pairs: FIGS. 4A(a) and (b), FIGS. 4A(c) and (d), and FIGS. 4B(e) and (f). This is taken into account when the pulse-width modulation is performed in accordance with the converter duty factor $\lambda c$.

That is, when the converter duty factor $\lambda c$ increases (decreases), the time ratios for FIG. 4A(b), FIG. 4A(d), and FIG. 4B(f) are increased (decreased) and the time ratios for FIG. 4A(a), FIG. 4A(c), and FIG. 4B(e) are decreased (increased) so that the average value of the converter voltage Vdc becomes high (low).

During this operation, the one-way switches 17, 19, and 21 are always off, the terminal B1 of the winding of the coupled inductor 3 is open, and the coupled inductor 3 acts as an inductor not as a transformer.

A step-up operation or a step-down operation is selected depending on the relationship between the inverter duty factor λi and the converter duty factor λc. If λi<λc, a step-down operation from the motor 7 to the battery 1 (i.e., regeneration from three-phase alternating current to direct-current voltage) is performed. If λi>λc, a step-up operation from the motor 7 to the battery 1 (i.e., regeneration from three-phase alternating current to direct-current voltage) is performed. Thus, step-up/down and acceleration/regeneration operations are performed.

Next, a description will be given of the principles of how the converter voltage Vdc is regulated in accordance with the converter duty factor λc. The converter voltage Vdc in the second power conversion circuit 32 is a potential between the terminals A1 and A2 of the windings of the coupled inductor 3. The terminal A1 is connected to the positive pole of the battery 1, and the terminal A2 is connected to the negative pole of the battery 1. This means that the converter voltage Vdc is the voltage of the battery 1.

Figure 12:
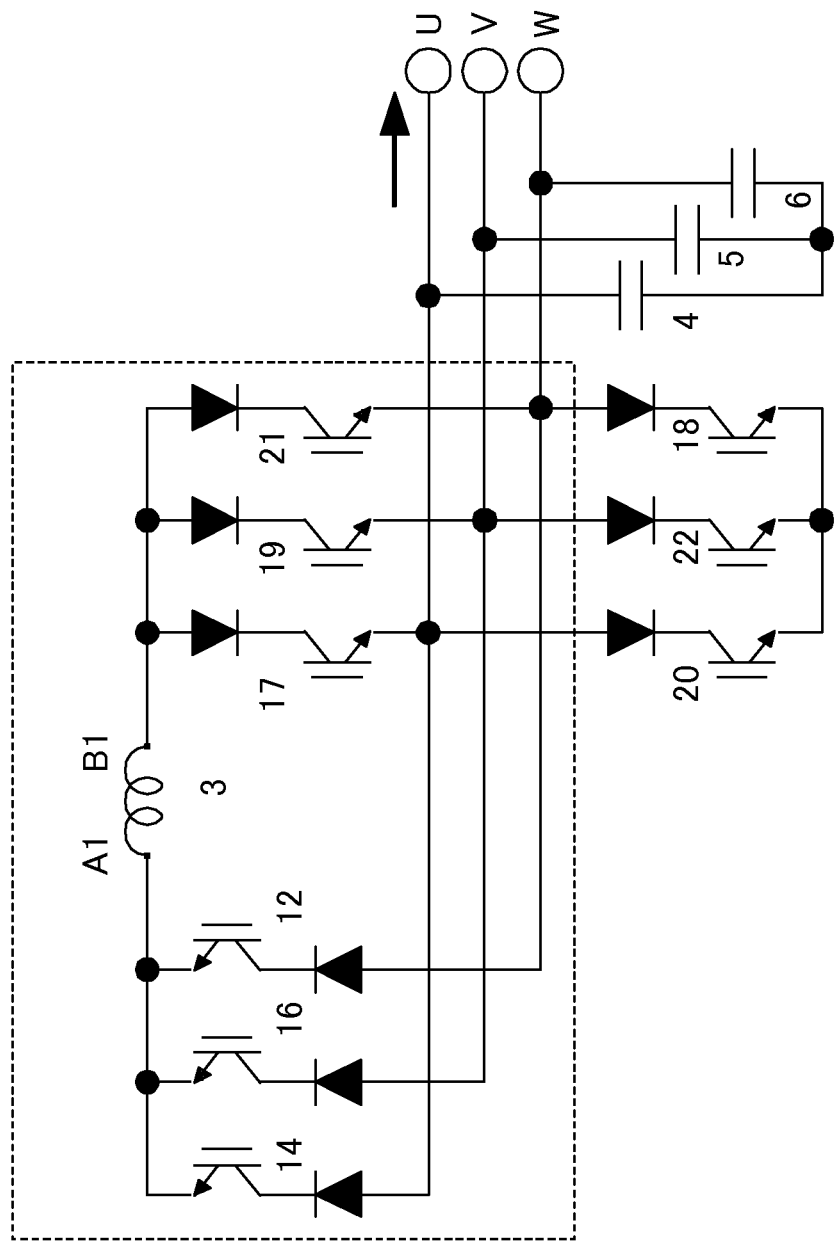
FIG. 12 is a block diagram illustrating a power conversion apparatus in a state where a converter voltage $V_{dc}=0$.

In the one-way switches 12, 14, and 16 of the first power conversion circuit 31, the negative poles where current flows in are connected to the respective negative poles of the one-way switches 18, 20, and 22 in the second power conversion circuit 32. At the same time, in the one-way switches 12, 14, and 16, the positive poles where current flows out are connected to the terminal A1 of the winding of the coupled inductor 3 and the positive pole of the battery 1. Therefore, a circuit such as that indicated within a dashed line in FIG. 12 is formed by the one-way switches 17, 19, and 21, the one-way switches 12, 14, and 16, and the winding A1-B1 of the coupled inductor 3. This means that this circuit has a configuration of a current-type power conversion apparatus where the converter voltage Vdc=0.

With this configuration, it is possible to regulate the converter voltage Vdc by switching the use of one-way switches, between a combination of the one-way switches 17, 19, and 21 and 18, 20, and 22 and a combination of the one-way switches 17, 19, and 21 and 12, 14, and 16. The switching between the set of the one-way switches 12, 14, and 16 and the set of the one-way switches 18, 20, and 22 is done by pulse-width modulation. The duration of each switch state is controlled by time-ratio control based on the converter duty factor λc described above. This makes it possible to control the average value of the converter voltage Vdc sequentially from zero to the battery voltage.

A description will now be given of a function of rapid switching between acceleration and regeneration according to the present invention.

It is necessary to satisfy the following two conditions: current flowing in the coupled inductor 3 is not interrupted; and a short circuit between input and output terminals is prohibited. The former is to prevent switch elements from being damaged by surge voltage generated during switching between acceleration and regeneration. The latter is to prevent switch elements from being burnt by overcurrent.

To satisfy these conditions, when the acceleration/regeneration signal changes, the pulse distributor 41 switches the drive signals S1c to S6c and the drive signals S1i to S6i for the one-way switches 11 to 22, for example, at the timing shown in FIGS. 3A(a) and (b) and FIGS. 4A(a) and (b).

Figure 7B:
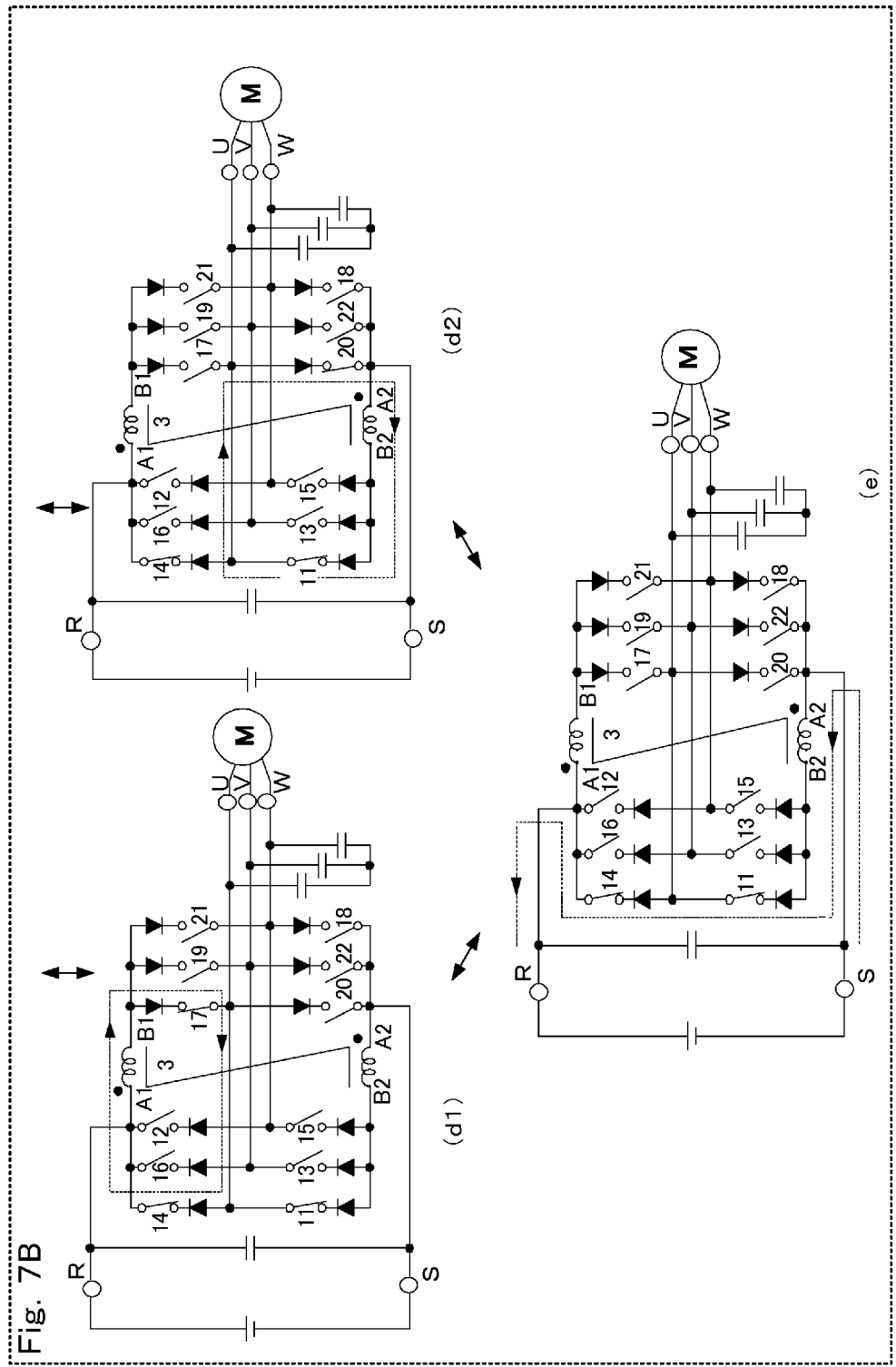

An operation for switching from acceleration to regeneration (from FIG. 3A(b) to FIG. 4A(b)) and its reverse operation will be described with reference to FIG. 7A and FIG. 7B.

Switching of operation from acceleration to regeneration is done by sequence processing in the following order: FIG. 7A(a), FIG. 7A(b1), FIG. 7A(c1), FIG. 7B(d1), and FIG. 7B(e). FIG. 7A(a) illustrates the same state as that illustrated in FIG. 3A(b). When the drive signal S4c is turned on in this state, the diode of the one-way switch 14 is reverse-biased by the inter-terminal voltage VRS of the battery 1 and turned off, so that the state of FIG. 7A(b1) is entered. When the drive signal S4i is turned off in this state, the diode of the one-way switch 14 is turned on and the state of FIG. 7A(c1) is entered. When the drive signal S1c is turned on in this state, the diode of the one-way switch 11 is reverse-biased by the inter-terminal voltage VRS of the battery 1 and turned off, so that the state of FIG. 7B(d1) is entered. When the drive signal S1i is turned off in this state, the coupled inductor 3 acts as a flyback transformer and current in the winding A1-B1 moves toward the winding A2-B2, so that the state of FIG. 7B(e) is entered. FIG. 7B(e) illustrates the same state as that illustrated in FIG. 4A(b). Then, a regeneration operation is performed.

When the two direct-current inductors acts as a flyback transformer, since the number of turns of the winding A1-B1 is the same as that of the winding A2-B2, current values before and after the moving of current are the same. Although current in the winding A1-B1 is interrupted, this does not mean interruption of current in the two direct-current inductors unlike the coupled inductor, because the two direct-current inductors operates to ensure a path that allows current to flow to the winding A2-B2. Surge voltage is generated by an inductance component of a line which is not coupled to the terminals of the winding A1-B1.

Switching of operation from regeneration to acceleration (from FIG. 4A(b) to FIG. 3A(b)) can be done by reversing the operation described above with reference to FIG. 7A and FIG. 7B.

It is also possible to realize switching from the state in which current flowing toward the direct-current side is zero. In this case, switching from acceleration (FIG. 3A(a)) to regeneration (FIG. 4A(a)) is performed in the following order: FIG. 7A(c1), FIG. 7B(d1), FIG. 7B(e), FIG. 7B(d2), and FIG. 7A(c2). A flyback operation is performed between FIG. 7B(d1) and FIG. 7B(e).

Switching from regeneration (FIG. 4A(a)) to acceleration (FIG. 3A(a)) is performed in the following order: FIG. 7A(c2), FIG. 7A(b2), FIG. 7A(a), FIG. 7A(b1), and FIG. 7A(c1). A flyback operation is performed between FIG. 7A(c2) and FIG. 7A(b2). The directions of switching order described above may be reversed.

As described above, by using the coupled inductor 3 as a flyback transformer, the pulse distributor 41 can perform switching between acceleration and regeneration safely and rapidly.

A description has been given of an embodiment which provides both a bidirectional step-up/down operation and a rapid switching operation between acceleration and regeneration. As long as it can be ensured that switching is performed after power supply to the loads is temporarily stopped and current flowing in the inductor becomes zero, the coupled inductor 3 may be replaced with two direct-current inductors which are not coupled to each other.

In this case, it is still possible to provide a high-efficient power conversion apparatus capable of performing a bidirectional step-up/down operation, without requiring multiple stages of power conversion.

Figure 8:
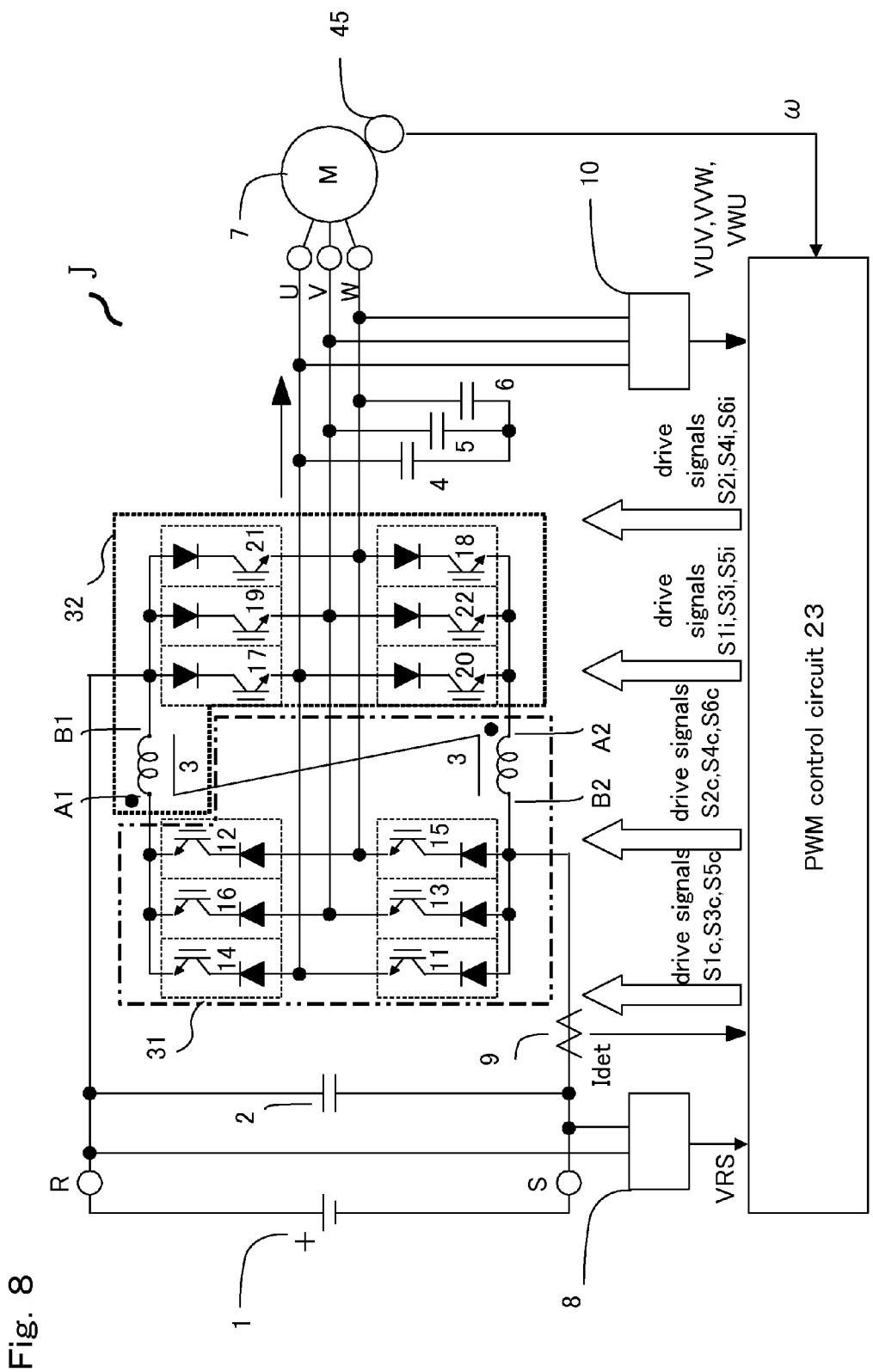
FIG. 8 is a block diagram illustrating a configuration of a power conversion apparatus according to a second embodiment of the present invention.

FIG. 8 is a block diagram illustrating a power conversion apparatus J according to a second embodiment of the present invention. In the power conversion apparatus I described above, the positive direct-current terminal of the first power conversion circuit 31 is the terminal R connected to the positive pole of the battery 1, while the positive direct-current terminal of the second power conversion circuit 32 is the terminal S connected to the negative pole of the battery 1. The power conversion apparatus J is different from the power conversion apparatus I in that the negative direct-current terminal of the second power conversion circuit 32 is the terminal R connected to the positive pole of the battery 1, while the negative direct-current terminal of the first power conversion circuit 31 is the terminal S connected to the negative pole of the battery 1. The description of the other components will be omitted here.

By changing the way of regulating the converter voltage Vdc in the pulse distributor 41 and the way of switching between acceleration and regeneration, the power conversion apparatus J can operate similarly to the power conversion apparatus I described above.

Again, as long as it can be ensured that switching is performed after power supply to the loads is temporarily stopped and current flowing in the inductor becomes zero, the coupled inductor 3 in the power conversion apparatus J may be replaced with two direct-current inductors which are not coupled to each other.

Figure 9:
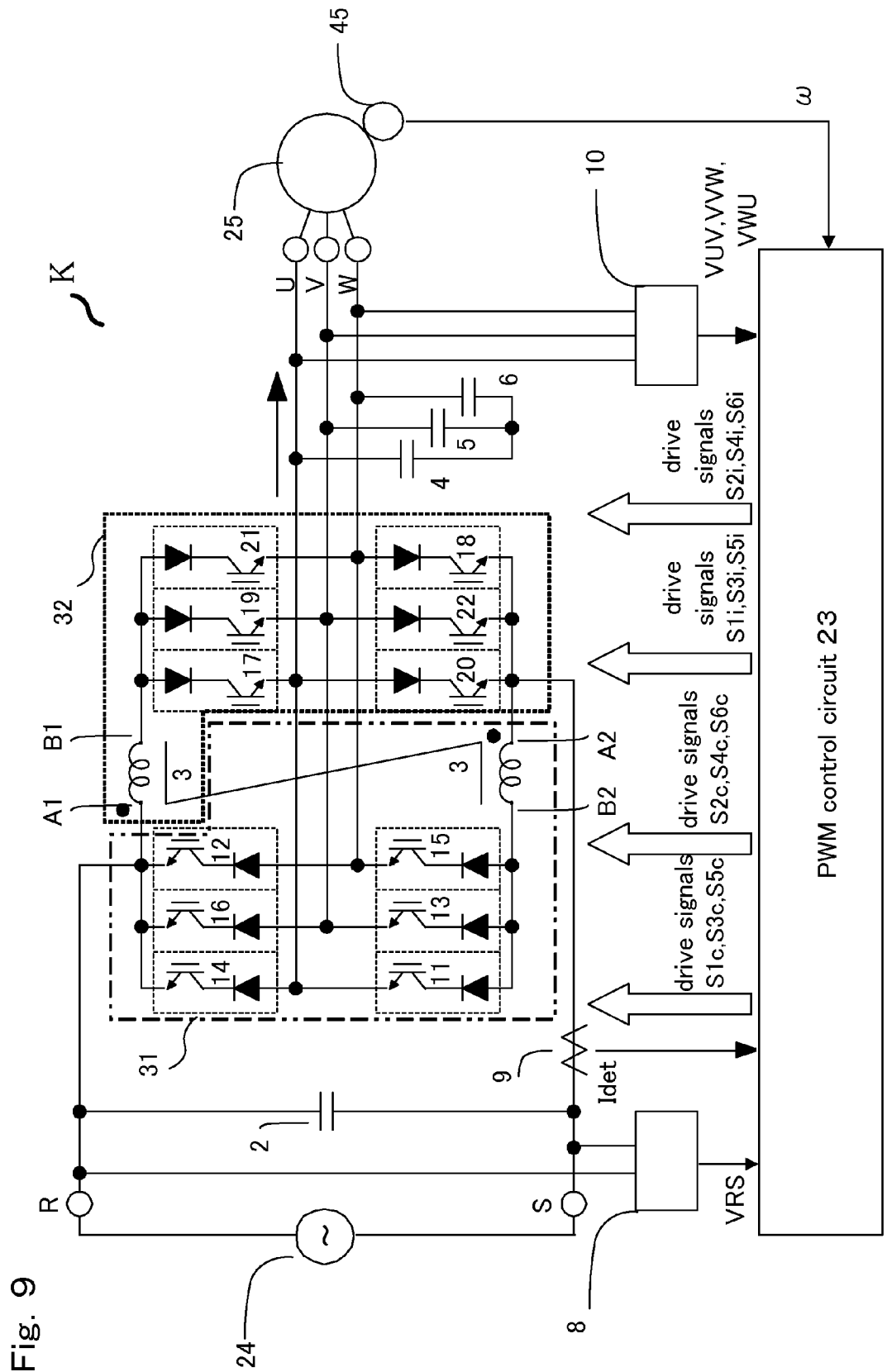
FIG. 9 is a block diagram illustrating a configuration of a power conversion apparatus according to another embodiment of the present invention.
Figure 10:
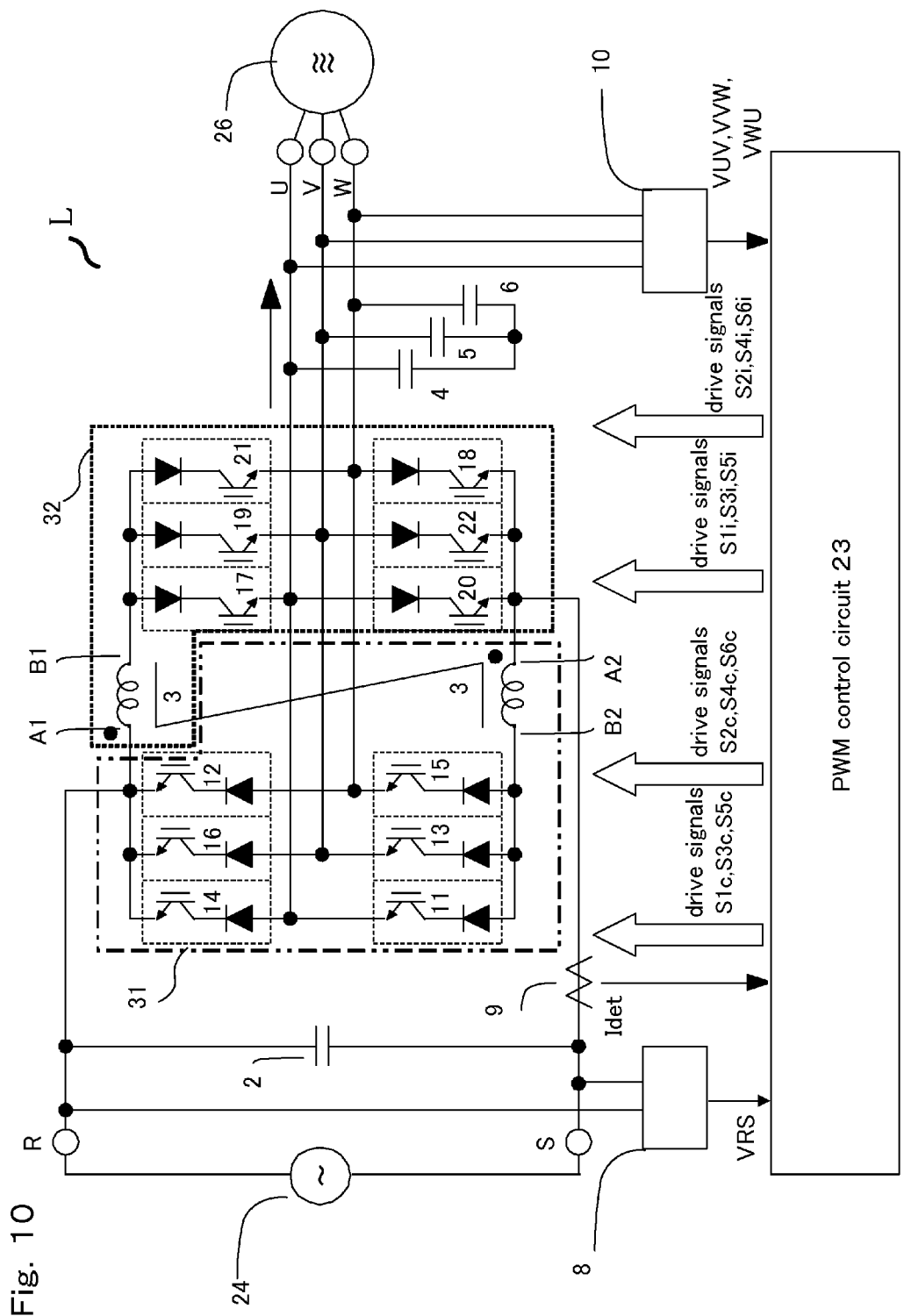
FIG. 10 is a block diagram illustrating a configuration of a power conversion apparatus according to still another embodiment of the present invention.
Figure 11:
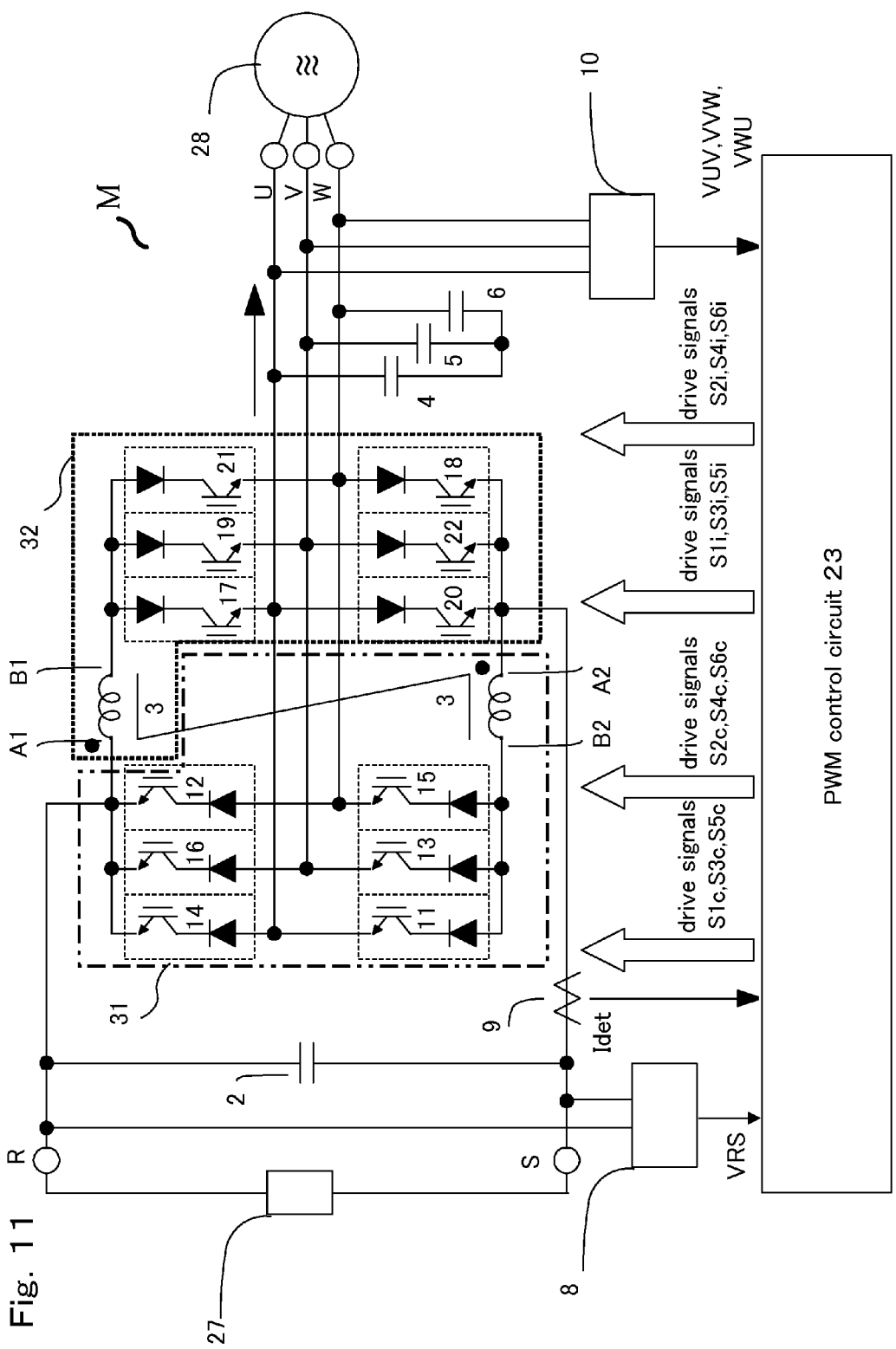
FIG. 11 is a block diagram illustrating a configuration of a power conversion apparatus according to still another embodiment of the present invention.

A power conversion apparatus K (see FIG. 9), a power conversion apparatus L (see FIG. 10), and a power conversion apparatus M (see FIG. 11) represent other embodiments of the present invention. In the power conversion apparatuses of the present invention, the direct-current terminals of the first power conversion circuit 31 and second power conversion circuit 32 are connected reversely to each other via the direct-current inductor. Therefore, the direct-current terminal of the power conversion apparatuses can have either positive or negative polarity. At the same time, the power conversion apparatuses of the present invention are capable of performing a bidirectional step-up/down operation.

In the power conversion apparatus K where a power generator 25 (instead of the motor 7) is provided on the three-phase alternating-current side and a single-phase alternating-current power supply 24 (instead of the battery 1) is provided on the direct-current side, power generated by the power generator 25 can be stepped up or down, converted, and supplied to the single-phase alternating-current power supply 24. This single-phase alternating-current power supply 24 serves as a single-phase alternating-current load.

In the power conversion apparatus L, a system power supply 26 on the three-phase alternating-current side can be connected in non-isolated connection to the single-phase alternating-current power supply 24 on the direct-current side.

In the power conversion apparatus M, a direct-current motor 27 is provided on the direct-current side and a three-phase alternating-current power supply 28 is provided on the three-phase alternating-current side. In the power conversion apparatus I described above, the control calculator 44 in the PWM control circuit 23 controls the direct-current inductor current command Idc* such that the feedback of the inter-terminal voltages VUV, VVW, and VWU is a desired value. In the power conversion apparatus M, however, if the control calculator 44 is replaced with a control calculator that controls the direct-current inductor current command Idc* such that the inter-terminal voltage VRS to be fed back is a desired value, a four-quadrant operation of the direct-current motor 27 is possible.

As described above, the present invention does not specify a load on the direct-current side (or single-phase alternating-current side) and a load on the three-phase alternating-current side.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A power conversion apparatus comprising:
    two power conversion circuits including a first power conversion circuit and a second power conversion circuit, the first power conversion circuit being connected in parallel to a direct-current load or a single-phase alternating-current load, the first and second power conversion circuits being connected in parallel to a three-phase alternating-current load;
    two direct-current inductors including a first direct-current inductor and a second direct-current inductor; and
    a pulse-width-modulation control circuit configured to pulse-width-modulate the two power conversion circuits,
    wherein the first and second power conversion circuits are current-type inverters and each of the first and second power conversion circuits are a switch including a transistor connected in series with a diode, and the first and second power conversion circuits are connected in reverse polarity to each other via the two direct-current inductors; and
    the pulse-width-modulation control circuit allows switching between the two power conversion circuits and realizes a bidirectional step-up/down operation between the direct-current load or single-phase alternating-current load and the three-phase alternating-current load.

2. The power conversion apparatus according to claim 1, wherein the two direct-current inductors are provided as a coupled inductor having a first winding and a second winding.

3. The power conversion apparatus according to claim 1, wherein the two power conversion circuits each include a plurality of one-way switches, each having self arc suppression capability and capable of allowing current to flow in one direction;
    the first power conversion circuit converts three-phase alternating current to direct current or single-phase alternating current;
    the second power conversion circuit converts direct current or single-phase alternating current to three-phase alternating current;
    a positive direct-current terminal of the first power conversion circuit and a negative direct-current terminal of the second power conversion circuit are connected to each other via the first direct-current inductor;
    a negative direct-current terminal of the first power conversion circuit and a positive direct-current terminal of the second power conversion circuit are connected to each other via the second direct-current inductor;
    the two direct-current inductors are connected such that the positive direct-current terminal of the first power conversion circuit and the positive direct-current terminal of the second power conversion circuit have the same polarity; and
    the positive pole of the first power conversion circuit and the positive pole of the second power conversion circuit are direct-current terminals, or the negative pole of the first power conversion circuit and the negative pole of the second power conversion circuit are direct-current terminals.

4. The power conversion apparatus according to claim 2, wherein the two power conversion circuits each include a plurality of one-way switches, each having self arc suppression capability and capable of allowing current to flow in one direction;

the first power conversion circuit converts three-phase alternating current to direct current or single-phase alternating current;

the second power conversion circuit converts direct current or single-phase alternating current to three-phase alternating current;

a positive direct-current terminal of the first power conversion circuit and a negative direct-current terminal of the second power conversion circuit are connected to each other via the first direct-current inductor;

a negative direct-current terminal of the first power conversion circuit and a positive direct-current terminal of the second power conversion circuit are connected to each other via the second direct-current inductor;

the two direct-current inductors are connected such that the positive direct-current terminal of the first power conversion circuit and the positive direct-current terminal of the second power conversion circuit have the same polarity; and the positive pole of the first power conversion circuit and the positive pole of the second power conversion circuit are direct-current terminals, or the negative pole of the first power conversion circuit and the negative pole of the second power conversion circuit are direct-current terminals.

5. The power conversion apparatus according to claim 1, wherein in pulse-width modulation for power conversion from the direct-current load or single-phase alternating-current load to the three-phase alternating-current load, one-way switches connected to a direct-current terminal are operated in the first power conversion circuit; and in pulse-width modulation for power conversion from the three-phase alternating-current load to the direct-current load or single-phase alternating-current load, one-way switches connected to a direct-current terminal are operated in the second power conversion circuit.

6. The power conversion apparatus according to claim 2, wherein in pulse-width modulation for power conversion from the direct-current load or single-phase alternating-current load to the three-phase alternating-current load, one-way switches connected to a direct-current terminal are operated in the first power conversion circuit; and in pulse-width modulation for power conversion from the three-phase alternating-current load to the direct-current load or single-phase alternating-current load, one-way switches connected to a direct-current terminal are operated in the second power conversion circuit.

7. A power conversion apparatus comprising:

two power conversion circuits including a first power conversion circuit and a second power conversion circuit, the first power conversion circuit being connected in parallel to a direct-current load or a single-phase alternating-current load, the second power conversion circuit being connected in parallel to a three-phase alternating-current load;

two direct-current inductors including a first direct-current inductor and a second direct-current inductor; and a pulse-width-modulation control circuit configured to pulse-width-modulate the two power conversion circuits, wherein the two power conversion circuits are current-type inverters, and are connected in reverse polarity to each other via the two direct-current inductors, and the pulse-width-modulation control circuit allows switching between the two power conversion circuits and realizes a bidirectional step-up/down operation between the direct-current load or single-phase alternating-current load and the three-phase alternating-current load, wherein the pulse-width-modulation control circuit includes a control calculator configured to output an acceleration/regeneration signal indicating a direction of power conversion, a converter duty factor $\lambda c$, an inverter duty factor $\lambda i$, and a current phase command $\theta i^*$ by using inter-phase voltages of the three-phase alternating-current load, a current Idc flowing in the two direct-current inductors, and an inter-terminal voltage VRS of the direct-current load or single-phase alternating-current load;

a carrier generator configured to output an uneven carrier waveform for varying a time ratio in accordance with the converter duty factor $\lambda c$, and output a carrier-period determination signal;

a current-type pulse-width-modulation calculator configured to generate drive signals $S1^*$ to $S6^*$ on the basis of the uneven carrier waveform, the inverter duty factor $\lambda i$, and the current phase command $\theta i^*$; and a pulse distributor configured to distribute the drive signals $S1^*$ to $S6^*$ to the two power conversion circuits on the basis of the acceleration/regeneration signal and the carrier-period determination signal.

8. The power conversion apparatus according to claim 2, wherein the pulse-width-modulation control circuit includes a control calculator configured to output an acceleration/regeneration signal indicating a direction of power conversion, a converter duty factor $\lambda c$, an inverter duty factor $\lambda i$, and a current phase command $\theta i^*$ by using inter-phase voltages of the three-phase alternating-current load, a current Idc flowing in the coupled inductor, and an inter-terminal voltage VRS of the direct-current load or single-phase alternating-current load;

a carrier generator configured to output an uneven carrier waveform for varying a time ratio in accordance with the converter duty factor $\lambda c$, output a carrier-period determination signal;

a current-type pulse-width-modulation calculator configured to generate drive signals $S1^*$ to $S6^*$ on the basis of the uneven carrier waveform, the inverter duty factor $\lambda i$, and the current phase command $\theta i^*$; and a pulse distributor configured to distribute the drive signals $S1^*$ to $S6^*$ to the two power conversion circuits on the basis of the acceleration/regeneration signal and the carrier-period determination signal.

9. The power conversion apparatus according to claim 2, wherein, to change a direction of power conversion between the direct-current load or single-phase alternating-current load and the three-phase alternating-current load, the pulse-width-modulation control circuit closes a current path of one of the first winding and the second winding and opens a current path of another of the first winding and the second winding.

10. The power conversion apparatus according to claim 1, wherein the direct-current load or the single-phase alternating-current load is any one of an electric storage device, a power generating device, a power supply, a power generator, and an electric motor; and the three-phase alternating-current load is any one of a system power supply, a power generating device, a power generator, and an electric motor.

11. The power conversion apparatus according to claim 2, wherein the direct-current load or the single-phase alternating-current load is any one of an electric storage device, a power generating device, a power supply, a power generator, and an electric motor; and the three-phase alternating-current load is any one of a system power supply, a power generating device, a power generator, and an electric motor.

12. The power conversion apparatus according to claim 2, wherein, during a change of a direction of power conversion between the direct-current load or single-phase alternating-current load and the three-phase alternating-current load, current flow in the coupled inductor having the first winding and the second winding is not interrupted.

13. The power conversion apparatus according to claim 1,
wherein one end terminal of the first power conversion circuit is directly connected with the direct-current load or the single-phase alternating-current load, and another end terminal of the first power conversion circuit is connected with the three-phase alternating-current load via one of the two direct-current inductors, and
wherein one end terminal of the second power conversion circuit is directly connected with the direct-current load or the single-phase alternating-current load, and another end terminal of the second power conversion circuit is connected with the three-phase alternating-current load via the other of the two direct-current inductors.

14. The power conversion apparatus according to claim 13, wherein both ends of each of the two direct-current inductors is provided to short via the switches.

* * * * *